United States Patent [19]

Geary, Jr. et al.

[11] Patent Number: 4,810,527
[45] Date of Patent: Mar. 7, 1989

[54] FREE SURFACE CASTING METHOD

[75] Inventors: James E. Geary, Jr., Boothwyn; Kenneth W. Leffew, Kennett Square; David R. Schiff, Philadelphia, all of Pa.; Richard D. Mules, Wilmington, Del.

[73] Assignee: E. I. Du Pont Nemours and Company, Wilmington, Del.

[21] Appl. No.: 98,600

[22] Filed: Sep. 18, 1987

Related U.S. Application Data

[63] Continuation-in-part of Ser. No. 909,181, Sep. 19, 1986, abandoned.

[51] Int. Cl.$^4$ .......................... B05D 1/26; B05D 1/40
[52] U.S. Cl. ..................... 427/54.1; 264/2.1; 264/310; 427/286; 427/386
[58] Field of Search ............... 264/1.3, 2.1, 106, 310; 427/240, 286, 54.1, 386; 118/409, 416; 425/375, DIG. 42; 156/632

[56] References Cited

U.S. PATENT DOCUMENTS

| | | | |
|---|---|---|---|
| 2,950,990 | 8/1960 | Johnson | 427/240 |
| 3,461,841 | 8/1969 | Marchese et al. | 118/413 |
| 4,457,259 | 7/1984 | Samuels | 427/240 |
| 4,492,718 | 1/1985 | Mayer et al. | |
| 4,498,415 | 2/1985 | Tsuchiya et al. | 118/409 |
| 4,514,439 | 4/1985 | Roundo | 427/240 |

FOREIGN PATENT DOCUMENTS

| | | | |
|---|---|---|---|
| 0072378 | 2/1983 | European Pat. Off. | 7/26 |
| 0138381 | 4/1985 | European Pat. Off. | 7/26 |

Primary Examiner—James Lowe

[57] ABSTRACT

Method for free surface casting an annular layer of film-forming liquid onto a substrate in a single pass by means of laminar flow through a slot die while the substrate and slot die are undergoing rotation relative to each other.

14 Claims, 4 Drawing Sheets

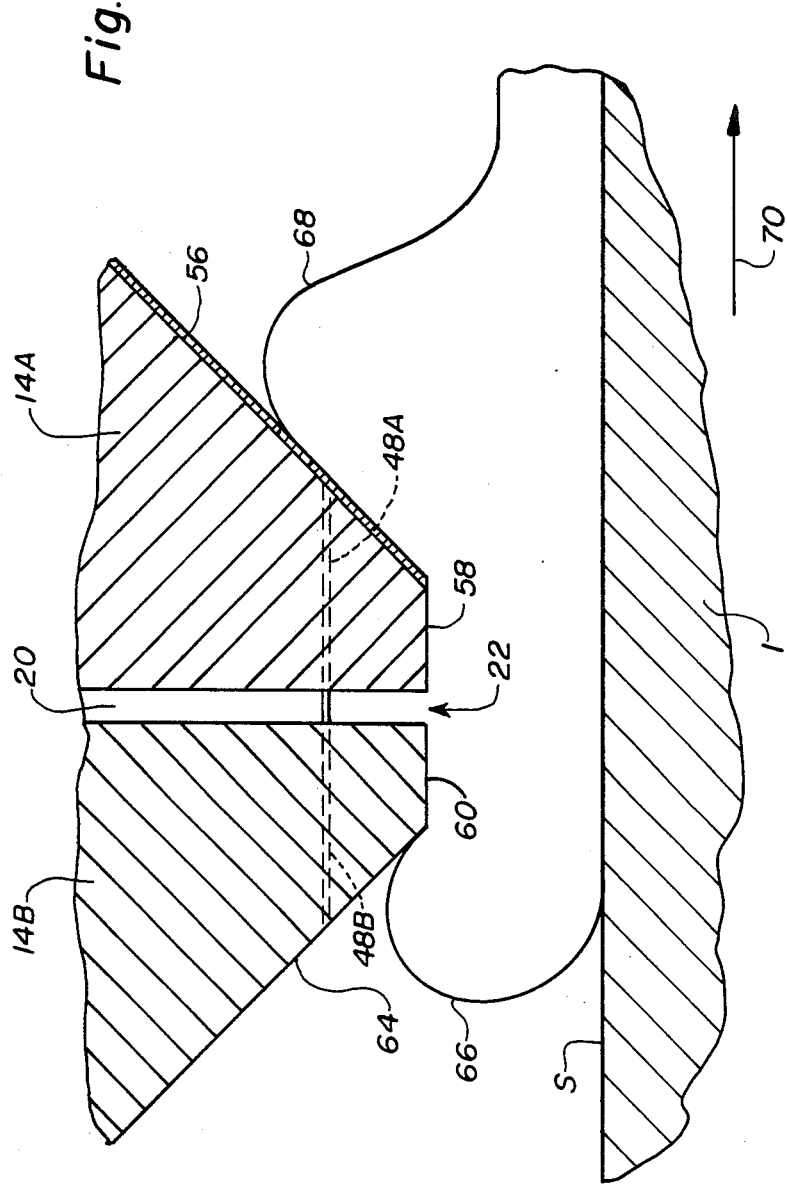

FREE SURFACE CASTING METHOD

CROSS REFERENCE TO RELATED APPLICATION

This is a continuation-in-part of U.S. patent application Ser. No. 909,181, filed Sept. 19, 1986, abandoned.

FIELD OF THE INVENTION

The invention relates to a method for free surface casting film-forming liquids onto annular substrates, particularly for use in the manufacture of optical recording media.

BACKGROUND OF THE INVENTION

In response to the demand for more reliable and higher capacity data storage and retrieval systems, there is considerable activity in the research and development of so-called optical disk recording systems. These systems utilize a highly focused modulated beam of light, such as a laser beam, which is directed onto a recording layer which is capable of absorbing a substantial amount of the light. The heat thusly produced causes the light-absorbing material in the areas struck by the highly focused laser beam to change chemically and/or physically, thus producing a concomitant change in optical properties, e.g., transmissivity or reflectivity, in the affected area. For readout, the contrast between the amount of light transmitted or reflected from the unaffected parts of the absorbing layer and from the marked areas of the layer is measured. Examples of such recording systems are disclosed throughout the literature and in numerous U.S. patents such as U.S. Pat. Nos. 3,314,073 and 3,474,457.

In recording data, a rotating disk having a light-absorptive recording layer is exposed to modulated radiation from a laser source. This radiation is passed through a modulator and appropriate optics, and the highly focused laser beam is directed onto the disk which forms by chemical and/or physical reaction of the light-absorbing layer a series of very small marks along a spiral path within the light-absorptive layer. The frequency of the marks is determined by the modulator inputs. Using laser beams with a focused spot diameter of 1 $\mu$m or less, data can be stored at a density of $10^8$ bits/cm$^2$ or higher.

The simplest optical disk medium consists merely of a dimensionally stable solid substrate on which is coated a thin layer of light-absorptive material such as a metal layer. When the lightabsorptive layer is struck by an intense beam of coherent light, such as from a laser source, the light-absorptive material is either vaporized and/or thermally degraded, thereby producing a very small marked area which exhibits different transmissivity or reflectivity than the adjacent unmarked area. Multilayer antireflection structures, such as those disclosed in U.S. Pat. No. 4,305,081 to Spong and U.S. Pat. No. 4,270,132 to Bell, increase the absorption of the laser beam which gives better read/write contrast than with the use of simple single layer media. Therefore, for purposes of obtaining better power efficiency, sensitivity and readout response of the record, it has been preferred to use multilayer antireflective structures.

There are two basic types of multilayer antireflective structures, one of which is basically a bilayer structure and the other a trilayer structure. In bilayer media, the substrate is coated with a very smooth, highly reflective material such as aluminum, on top of which is coated a layer of moderately light-absorptive material which is preferably of a thickness corresponding to about $\lambda/4n$, where $\lambda$ is the wavelength of the recording light source and n is the refractive index of the light-absorptive layer. In trilayer media, the substrate is likewise coated with a first layer of very smooth highly reflective material on which is coated a second layer of transparent material. Atop the transparent second layer is coated a thin third layer of strongly light-absorptive material. The combined thickness of the transparent and absorptive layers is preferably adjusted to be about $\lambda/4n$. In both types of structures, the adjustment of certain layer thicknesses according to the wavelength of light and refractive index of the layer is for the purpose of minimizing the amount of light reflected from the unmarked areas and minimizing the amount of light reflected from the marked areas, thus producing a higher playback signal amplitude. A detailed discussion of the three types of disk construction is given by A. E. Bell in *Computer Design*, January 1983, pp. 133-146 and the references cited therein. See especially Bell and Spong, *IEEE Journal of Quantum Electronics*, Vol. QE-14, 1978, pp. 487-495.

It will be realized, of course, that the terms "bilayer" and "trilayer" refer only to the fundamental optical layers and do not exclude the use of ancillary layers such as a dust defocussing layer.

Ancillary layers for optical media are frequently made of polymeric materials, However, the deposition of polymer films on optical recording disks is a particularly difficult task because of the very high uniformity requirements for the surfaces of such media. Depending on the nature of the film, such layers may be applied by laying down an integral film, spin coating or spraying a thin polymer solution, in situ plasma polymerization, sputtering or by free surface casting. Each of these has its appropriate niche in the manufacture of optical recording disks. However, each has its disadvantages as well. For example, plasma polymerization and sputtering are satisfactory only for very thin coatings which do not exceed about 5000Å thickness. On the other hand, applying an already-formed film is not useful for films that are less than about 500 $\mu$m thickness because of the difficulty of applying them uniformly. Spin coating is useful for certain applications however radial deviations in the thickness of the coating are a problem. Heretofore free rotational casting has not been a useful coating method for annular disks because of the difficulties (1) in applying the coating uniformly over the entire surface of the annulus, (2) in applying the coating at a rate rapid enough to be suitable for commercial production, and (3) in applying the coating in a single rapid pass in such fashion as to avoid a "seam" at the end of the rotation.

The invention is therefore directed to a novel and inventive method for rotational free casting of film-forming liquids upon annular substrates in a single pass in such manner that the seam is insignificant and the coating time is consistent with commercial production rates.

SUMMARY OF THE INVENTION

The invention is directed to a method for free surface casting a thin annular layer of film-forming liquid onto a substrate in a single pass by means of laminar flow through a slot die while the substrate and slot die are undergoing rotation relative to each other comprising the steps of:
a. positioning the slot die closely over the surface of the substrate;
b. beginning relative rotation of the slot die and substrate and flow of liquid through the die slot onto the substrate, thus forming a continuous thin film of liquid between the slot and the substrate.
c. continuing rotation and liquid flow through a predetermined angular distance;
d. stopping liquid flow where the liquid thin film meets the liquid layer already on the substrate; and
e. stopping rotation and breaking liquid contact between the die and substrate.

BRIEF DESCRIPTION OF THE DRAWINGS

The drawing consists of five figures:
FIG. 5 is an enlarged partial cross section view looking from the outer radius of the liquid annulus showing the interface between the die lips, coating liquid, and substrate surface.

PRIOR ART

U.S. Pat. No. 4,492,718, Mayer et al.
This patent is directed to a method of applying a transparent acrylate prepolymer formulation to a disk substrate by applying to the rotating disk a series of spiral, flowable liquid, uniformly spaced bead segments which are allowed to spread out on the disk to form a uniform coating.

DETAILED DESCRIPTION OF THE INVENTION

Figure 1:
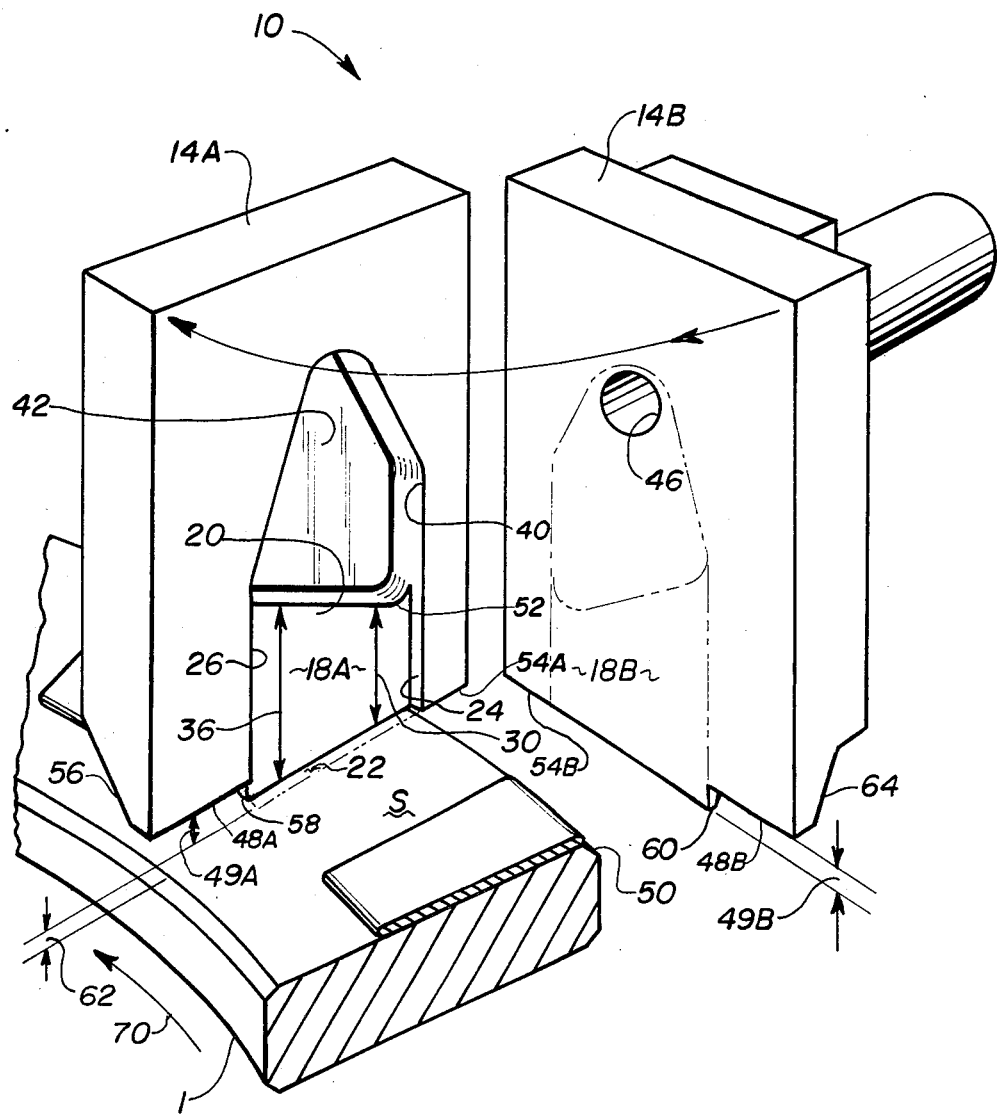
FIG. 1 is a drawing of a slot die of the type which has been found to be useful in the best mode of practicing the invention.

Referring to FIG. 1 of the drawing, a slot die 10 is depicted which comprises a pair of die members 14A, 14B, respectively. Each die member 14A, 14B has a land surface 18A, 18B, respectively thereon. When the die members 14A, 14B are mounted in the confrontational relationship shown in the drawing, the respective land surfaces 18A, 18B cooperate to define an extrusion slot 20 having a mouth 22. In FIG. 1, the broken lines on die member 14B designate the area on that member that forms the operating volumes of the slot die when 14A and 14B are in a confronting relationship. The broken lines below member 14A designates the mouth area 22 formed when 14A and 14B are confronting each other. The lateral width of the slot 20 is defined by a first end 24 and a second, spaced, end 26. The confronting lands 18A, 18B in the vicinity of the first end 24 of slot 20 have a first predetermined length 30 which increases as one proceeds across the confronting lands 18A, 18B toward the second end 26 of the slot. At this second end, the confronting lands 18A, 18B have a second predetermined length 36 which is greater than the first length 30. The length of the lands play a role in determining the flow rate of liquid leaving a position along the mouth of the slot. The longer land at a position produces a lower flow rate at that position; for example, the flow rate at 36 is less than the flow rate at 30. The land length need not, however, increase linearly with position across the lands.

One and/or both of the die members may be provided with a recess 40 therein which, when the dies are mounted together, defines therebetween a pressure distributing zone 42 to make uniform the coating pressure applied to the fluid entering slot 20. The zone 42 communicates with the slot 20 throughout its lateral extent. The zone 42 also communicates via an inlet channel 46 with a source of film-forming material to be extruded through the slot 20 onto a substrate.

Due to the increasing length of the slot as one proceeds along the slot from the first end to the second end, a predetermined extrudate flow profile is defined across the length of the slot upon application of a predetermined coating pressure. As mentioned above, the rate of the increase in slot length from 30 to 36 may be nonlinear in order to produce a selected flow profile across the slot. At the lateral ends of the slot, such as at 52, the slot length may be increased locally as shown to decrease the flow rate locally at the ends of the mouth to limit lateral spreading of the liquid as it emerges from the die mouth 22.

Referring to FIGS. 1 and 5, the undersurfaces of the die surrounding the die mouth 22 are designed to minimize fluid accumulation on the die surfaces and to prevent uncontrolled spreading of the fluid as it leaves the mouth. The two surfaces 58, 60 adjacent the long axis of the mouth are narrow, about 10 mils (250 μm) wide, to minimize the horizontal surface area that fluid can stick to. The die members are preferably chamfered across their width at 56 and 64 to accomplish this. Surfaces 54A and 54B, adjacent the short axis of die mouth 22 and the outer edge of the substrate, can continue horizontal without chamfering since the chamfered edge 50 of the substrate prevents capillary type spreading of the fluid at this location to define the outer annular radius. At the opposite end of die mouth 22, where the substrate continues horizontally, the surfaces 48A and 48B of the die are stepped up by a predetermined distance 49A and 49B on the order of 20 mils (250–500 μm) to increase the gap between the die and the substrate, stop fluid spread and thus define the inner annular radius which is to be coated. To prevent excess flow, or spreading, of the liquid out the side of the mouth at the step, a nonwettable coating such as TEFLON fluoropolymer resin is applied to the step surfaces 48A and 48B. Without the increased gap, the TEFLON fluoropolymer resin coating by itself does not adequately control spreading. Alternatively, the substrate could contain a step down and the die surface could continue horizontal without step 49 as at 54.

Figure 2:
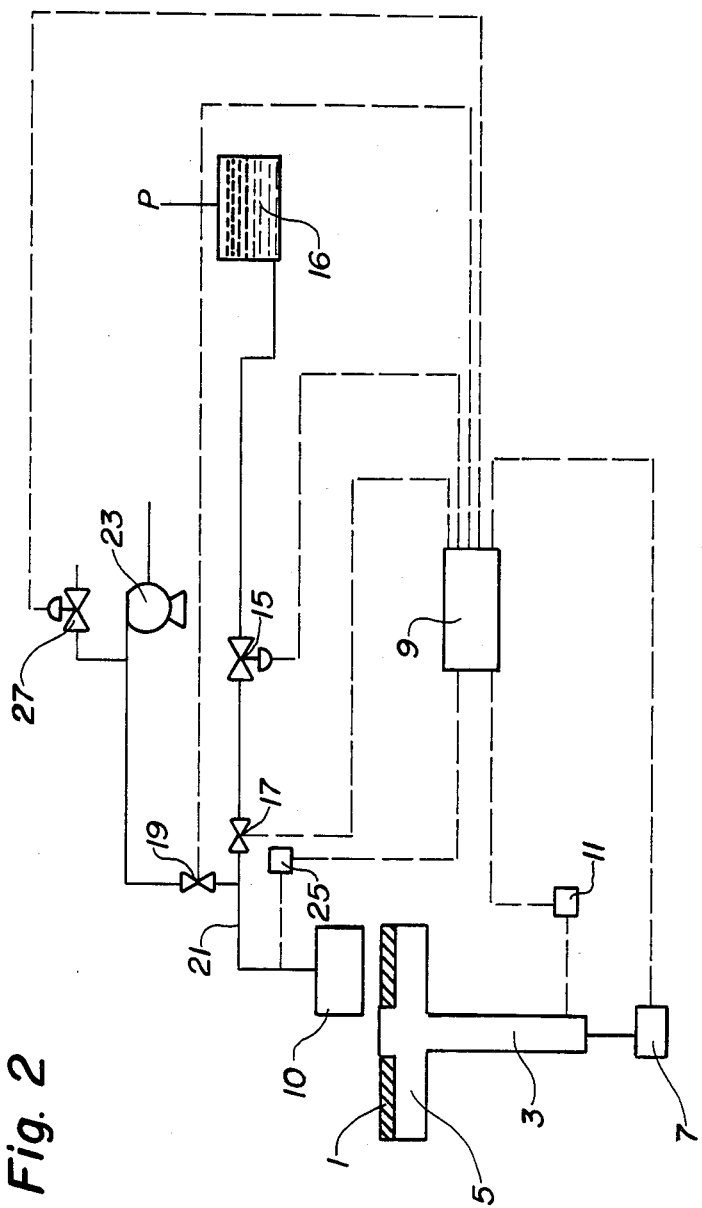
FIG. 2 is a schematic diagram of the disk coating system for practicing the invention including the control means therefor.

FIG. 2 of the drawings illustrates schematically the flow and control apparatus for carrying out the method of the invention and its operating inter-relationships.

An annular substrate 1 of aluminum coated with a thin planarizing layer of polymer plus any additional thin layers is placed on rotatable spindle 3. Spindle 3 is comprised of a positioning table 5 which is driven by motor drive 7. The substrate is firmly held to the positioning table by vacuum. Motor drive 7 receives commands from pressure and rotation controller 9 which, in turn, receives spindle speed and rotational positional information from rotation transducer 11. The process control strategy is regulated by a predetermined program which is effected by controller 9 via manipulation of spindle motor 7, flow on-off valve 17, flow control valve 15, vacuum on-off valve 19, vacuum control valve 27, and feedback of process information through rotational transducer 11 and pressure transducer 25.

To initiate the medium coating process for a 7 mil (175 μm) coating, slot die 10 is positioned closely above the annular substrate surface with the long axis of the slot situated radially with respect to the annular substrate 1. The position of slot die 10 must, of course, be such that the distance between its mouth and the underlying medium is uniform over the annulus of the medium. The preferred coating position is 10 to 18 mils (250 to 450 μm) clearance height at 62 between the outlet of the slot die at mouth 22 and the substrate surface (S), which is to be coated with liquid. Proper film formation as the fluid monomer leaves the die and contacts the substrate is obtained by precise placement of the die relative to the substrate in the coating mode. Improved seam formation is obtained by coating the trailing die lip chamfer 56 (FIGS. 1 and 5) with a non-wetting organic material, such as TEFLON fluorocarbon resin. Other materials having a low surface energy can also be used.

It is important that the leading die lip chamfer 64 is a surface that is wetted by the film forming liquid. Such a surface is preferably the steel surface the die is made of. In FIG. 5, the film forming liquid is shown forced out beyond the mouth 22 in a direction opposite the relative motion between the substrate and die as defined by arrow 70. This forms a leading bead of flowing liquid 66 that is forced under the die lip surfaces 60 and 58 as the film is formed on the substrate by the relative motion. It is thought that the action of the leading bead maintains a pressure in the liquid between the die and the substrate that is above the ambient pressure external to the die. This insures that the fluid is forced against the substrate rather than letting the liquid free-flow or be pulled from the die. This condition insures continuous wetting of the liquid on the substrate surface (S), prevents flow irregularities or streaking of liquid, and prevents air from being trapped between the liquid and the substrate. The leading bead is established and maintained by control of the coating pressure, the die/substrate relative motion and the die clearance height. On the trailing die lip chamfer 56, the relative motion of the die and substrate tends to cause a relatively large trailing bead of flowing liquid to form. It is desirable to minimize this trailing bead 68 with the non-wetting coating provided on the trailing die lip chamfer 56. A consistent small trailing bead minimizes the problem of distributing this liquid when the seam is formed at the completion of the annular layer.

The inner end of each of die members 14A and 14B is vertically stepped, or offset, as at 48A and 48B, thereby to define a clearance distance comprised of steps 49A and 49B and clearance height 62 between the undersurface of the die members 14A and 14B and substrate S. The step 49 helps to reduce spreading of the extrudate being layered onto the substrate S along surface 48. Although surface 48 is shown in the figure as being parallel to the substrate S it should be understood that the surface 48 may also be inclined with respect to the surface S. Of course, the alternative is true as well. That is, the substrate S may itself be stepped or beveled, as the case may be, to define the relative clearance distance between surfaces 48A and 48B on the die members 14A, 14B and the substrate S. This is exemplified as at 50 in FIG. 1. The clearance distance, however defined serves to minimize accumulation of fluid extrudate on surfaces 48A and 48B of the die members and to prevent uncontrolled spreading of the extrudate on substrate S as it leaves the mouth 22 of slot 20. A non-wetting coating, as described above, may be applied to each surface 48 of the die members to improve its function. Typically, the clearance height 62 is, at a minimum 10–20 mils (250–500 μm). The edges such as 56 and 64 of the die members 14A, 14B are preferably chamfered to further minimize the spread of fluid after coating is stopped.

It is preferred that the slot die 10 have the following elements of design:

1. The land area of the die is such that the proper volume of monomer is applied across the disk diameter while the substrate is rotating under the die to compensate for both the effect of radius on lineal velocity of the substrate and for the radial flow of fluid which occurs after application due to centrifugal force.

2. Specific areas of the underside surfaces 48 and 54 and trailing edge 56 of the die are coated with TEFLON fluoropolymer resin or other nonwetting resin to achieve control of the inside and outside diameters of the coating and to preclude the fluid's trailing the die during the coating operation.

3. The die is designed to provide pressure drop due to flow of monomer during the coating cycle which is controllable (in the range of 20 to 60 psia or 1.4–4.2 kg/cm$^2$) at a die land spacing of 3 to 4 mils (75–100 μm) defined by slot ends 24 and 26.

The total flow of coating liquid to the substrate surface is regulated by controlling the pressure of the liquid at the pressure distributing zone 42 of slot die 10 in synchronization with the rotational position of the spindle 5. Pressure (and thus liquid flow) is regulated by means of a pressure control valve (PCV) 15 on the outlet of pressurized feed reservoir 16 which is manipulated by a digital adaptive control algorithm responding to errors between the observed pressure and the pressure setpoint. Pressure (P) above the fluid in the feed reservoir 16 is typically held constant at a level well above the coating pressure in the die plus the pressure drops in the connecting lines. For instance 90 psia, supplied by nitrogen or other inert gas, would be used for a maximum die coating pressure of 50 psia. During the start of the coating process, the coating pressure in the die, sensed by transducer 25 located close to pressure distributing zone 42, is ramped up in a prescribed fashion. Spindle speed is controlled simultaneously to achieve the desired coating thickness through the entire rotation of the disk.

As one complete revolution of the disk nears, the pressure setpoint ramps down and the pressure-supplied flow is shut off by flow on-off valve 17 while a second on-off valve 19 opens allowing the flow line 21 and die to be subjected to vacuum from vacuum pump 23, resulting in a decrease of pressure at the die. The die pressure decreases to just below atmospheric, which initiates reverse flow of liquid, thus precluding any further flow through the die. After achieving flow stoppage the pressure setpoint is increased to a level which maintains a desired fluid head in the die. This procedure ensures that flow control during the start of coating from disk to disk will be consistent. At a prescribed point near the end of the cycle, the table is stopped, and the die is lifted from the coating position thereby breaking liquid contact between the die and substrate. In one example, the total time to apply about 15 grams of fluid in a 7 mil layer in a single pass is only about 12 seconds. This is a significant improvement over the '718 patent where a similar 7 mil layer required about 25 revolutions at about 4 rpm (cols. 26 and 28) or about 375 seconds or greater (since the rpms are gradually reduced to keep the same application speed in the longer outer spirals). The instant invention represents at least a 30× improvement in production speed for depositing the liquid on the substrate. After depositing the liquid, the die is removed from over the disk and the applied layer may then be allowed to settle (planarize) for a short time before initiation of curing. A settling time of 60–300 seconds before curing is typical.

The curing process involves photohardening of the applied liquid layer, which typically consists of enclosing the substrate with a transparent covering and exposing the wet coating to a point source of UV radiation for from 10 to 60 seconds.

A preferred method for practicing the invention involves the sequential steps of:

a. positioning the slot die closely over the surface of the substrate;
b. simultaneously beginning relative rotation of the slot die and substrate and low flow of liquid through the die slot, thus forming a continuous thin film of liquid between the slot and the substrate, and accelerating both the rotation and the flow so that both reach a preselected operating rate within a first predetermined angular distance;
c. continuing rotation and liquid flow at the preselected operating rates through a second predetermined angular distance;
d. simultaneously changing the rotation speed to a higher or lower constant rate and reducing the liquid flow to zero within a third predetermined angular distance;
e. initiating reverse flow of film-forming liquid through the die;
f. simultaneously stopping rotation and rapidly removing the slot die away from the surface of the substrate before it completely retraverses the first predetermined angular distance; and
g. stopping reverse flow of film-forming liquid.

The annular liquid layer cast by the process of this invention is typically cured to form a solid layer by any of the known curing processes. Such curing processes include evaporation of solvent from solutions of film forming composition, thermally or photolytically hardening solvent-free liquid composition by polymerization and/or crosslinking mechanisms, chemically hardening multi-component liquid compositions, etc. Particularly preferred liquids are the photohardenable liquids disclosed in assignee's co-pending applications U.S. Ser. No. 760,946 and U.S. Ser. No. 760,947 both filed on July 31, 1985.

The above-described process involves a large number of parameters as follows:

TABLE 1

PARAMETER LIST pressure Profile
1. Position of disk at start of Pressure ramp-up (degrees)
2. Rotation of disk during pressure ramp-up (degrees)
3. Maximum Coating Pressure (psia)
4. Position of disk at start of pressure ramp-down (degrees)

TABLE 1-continued

PARAMETER LIST

5. Rotation of disk during pressure ramp-down (degrees)
6. Coating pressure at end of ramp-down (psia)
7. Minimum pressure during vacuum application (psia)
8. Position of disk at switch to vacuum (degrees)
9. Time from die lift to minimum pressure (sec)
10. Pressure at vacuum solenoid closure (psia)
11. Hold pressure at end of vacuum application (psia)

Rotation Profile
12. Velocity at beginning of cycle (RPM)
13. Position of disk at start of acceleration (degrees)
14. Rotation of disk during acceleration (degrees)
15. Velocity during coating (RPM)
16. Position of disk at start of acceleration at end of cycle (degrees)
17. Rotation during acceleration at end of cycle (degrees)
18. Velocity after acceleration at end of cycle (RPM)
19. Position of disk at die lift (degrees)
20. Position of disk at stop of rotation (degrees)

Die Positioning Parameters
21. Acceleration of die during lift (in/sec/sec)
22. Final velocity of die during lift (in/sec)

Miscellaneous Parameters
23. Die Clearance Height (mils)
24. Levelling time (sec)

This large number of parameters has evolved from the need very precisely to control the relative coating pressure and rotational speed of the table. In fact, it has been found that the best means to regulate this process is based on a closed loop control strategy which correlates both the slot die coating pressure and the rotational speed with rotational position of the disk. The quality of the coating in terms of optical flatness has been found to be significantly affected by the selection of the relative setpoint profiles of coating pressure and rotational speed. The general form of a particular correlation which has proven to produce acceptable coatings is given in FIGS. 3 and 4 and the importance of various elements of the Parameter List above will be illustrated in the Examples.

EXAMPLES

Six annular substrate disks were coated by the process of the invention to form a uniformly smooth coating of film-forming liquid, which was subsequently cured by exposure to a source of ultraviolet light. In these examples, three different coating liquids were applied by the process of the invention (noted by the different fluid viscosities in Table 3). The application process was adjusted by means of the control parameters listed in the Parameter List, above, to achieve uniformly flat coatings (within the tolerances required of the optical disk media) in each case.

We have found that some of the elements in the above-referred Parameter List may be held constant without significantly affecting the performance of the process, when coating thicknesses of nominally 5 to 10 mils (125–250 μm). For example, the die positioning constants determine the rate at which the die is removed from the vicinity of the disk at the end of the coating cycle, which affects the thickness of the coating in the area where the die is lifted. However, we have found that other parameters in the coating process dominate the coating uniformity and that the rate at which the die lifts should be regulated, but need not be adjusted during coating. In addition, the clearance height between the die and the disk in the coating mode affects the size of the leading fluid bead which is formed on the leading die lip. Again, however, by keeping the clearance height constant, other coating parameters may be more conveniently changed to affect the size of the bead.

Consequently, for these examples, Table 2 illustrates those parameters which were fixed. The method of this invention does not require these parameters to be constant, but a best mode of operation for a 7 mil (175 μm) coating is illustrated by keeping them constant.

Start of Flow

By setting both the position of the disk at the start of the pressure ramp-up and the rotation during ramp-up at 0 degrees, the pressure setpoint at the beginning of the cycle is a stepchange from the hold pressure to the maximum coating pressure. The adaptive design of the pressure controller, 9 provides a reproducible closed-loop response to this setpoint stepchange, independent of changes in the fluid or die. By fixing the pressure ramp-up in this manner, the flow rate of liquid through the die during the start of flow to the disk is consistently the same from run to run. Then, since the table rotational speeds at the beginning and during the coating stage of the process are fixed, the nature of the coating at the start of rotation is controlled by adjusting when rotational ramp-up is started (parameter 13) and the rotation over which the ramp-up to the coating speed occurs (parameter 14). Changes in these parameters affect the size of the leading bead 66 which is formed on the leading die lip 60 and the shape of the coating which is applied to the disk at the start of flow.

Coating

Since most of the rotation takes place at a fixed rotational speed, the thickness obtained is determined by the flow rate of liquid to the disk, which is directly proportional to the pressure drop through the die (parameter 3). The required pressure drop to obtain a specified thickness will also increase as the slot width decreases and as the liquid viscosity increases.

Cessation of Flow

At the end of the cycle, several steps must occur to give a uniform coating thickness: the beads of liquid in contact with the die lips and chamfers must be discharged onto the disk, the flow of fluid from the die must be stopped, the die must be removed from fluid contact with the disk, the coating that was placed onto the disk at the start of flow must be overlaid with fluid at the end, and the amount of fluid remaining in the die must be controlled to ensure that the flow start-up from disk to disk will be consistent. The process of this invention accomplishes each of these steps by controlling the pressure drop across the die in conjunction with the rotating speed of the table.

As the end of the cycle approaches, the pressure setpoint is ramped down from the maximum coating pressure to nearly atmospheric over a fixed rotation of the disk. The pressure controller 9 attempts to follow this setpoint by closing the flow valve 15 in the flow line thus cutting off the supply pressure to the die. However, because of fluid momentum within the line, the flow of fluid continues. At a prescribed rotation of the disk, the two on-off valves 17 and 19 switch, respectively cutting off completely the pressure supply to the die and opening the flow line to the vacuum source. Pressure control is now accomplished through manipulation of control valve 27 in the vacuum line until the flow exiting the die stops and flow reverses in the die. To distribute the beads of fluid which are in contact with the die lips and chamfers, the table accelerates at a prescribed rotation. Finally, the table stops and the die lifts thus breaking fluid contact with the disk. The pressure within the die is controlled to a prescribed value to ensure that the liquid level within the die is regulated.

Figure 3:
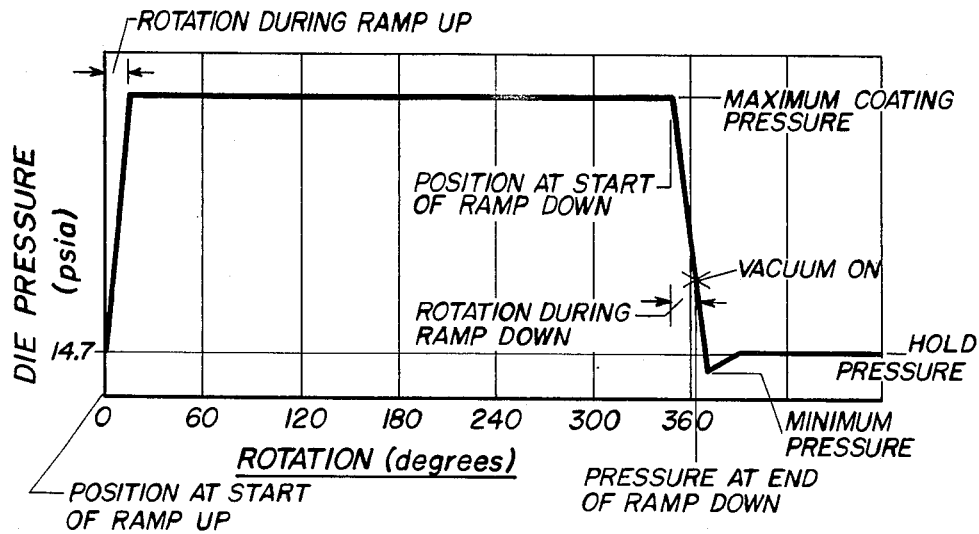
FIG. 3 is a graphical representation of a correlation of die pressure with the degree of rotation for the variable set points during the process.
Figure 4:
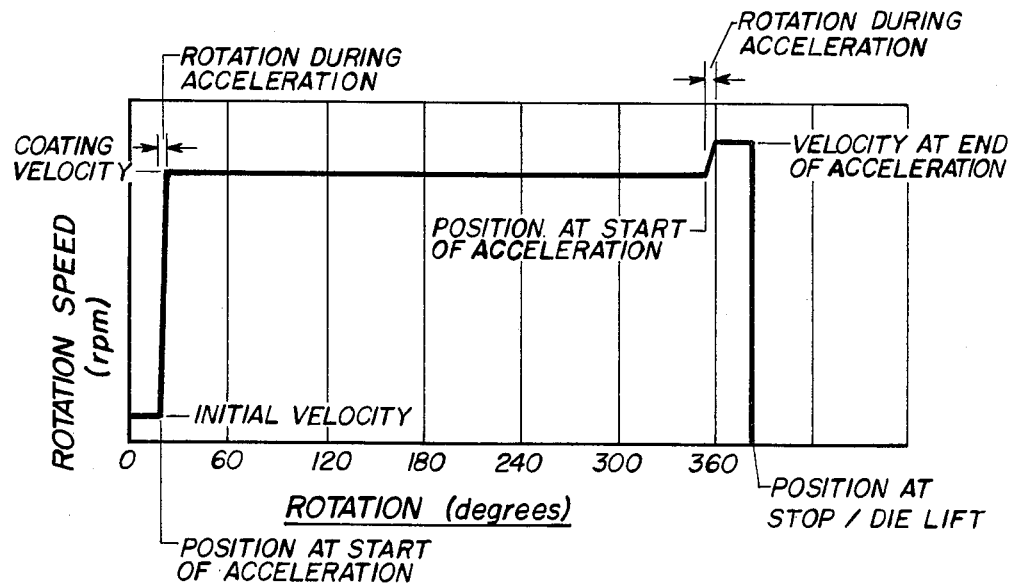
FIG. 4 is a graphical representation of a correlation of rotation speed with the degree of rotation for the variable set points during the process.

The preferred coating process can be better understood by considering in detail the operation described for Example 1 in Table 3 and with reference to FIGS. 3 and 4. The specific steps referring to Example 1 of Table 3 are the following:

1. An annular substrate is loaded onto the spindle and the die is lowered to place it at a clearance height of 15 mils (375 μm) above the disk surface in a radial position that will result in the annulus being coated with fluid.
2. Begin rotation of the spindle at 0.01 rpm.
3. Open the flow on-off valve, 17. This action resets the rotation counter to 0 degrees and begins the cycle.
4. At the instant that the valve 17 opens, the pressure setpoint is increased from the hold pressure (15.3 psia (1.08 kg/cm$^2$) indicated by the pressure transducer) to the regulated coating pressure of 46 psia (3.23 kg/cm$^2$). The closed-loop control system will now drive the pressure to the setpoint in a prescribed fashion dictated by the adaptive tuning constants of the pressure and rotation controller 9.
5. When the rotation counter reaches 0.012 degrees the speed setpoint is linearly ramped to 5 rpm over 35 degrees of rotation by rotation controller 9.
6. The pressure remains at 46 psia and the table speed remains at 5 rpm for the bulk of the coating.
7. When the rotation counter reaches 348.5 degrees (13 degrees before the position at which the table will stop) the pressure setpoint is ramped down over 5 degrees of rotation from 46 psia to 14.8 psia (1.04 kg/cm$^2$). The pressure controller 9 will now decrease the delivery pressure by throttling of the flow control valve, 15.
8. When the rotation counter reaches 350 degrees (11.5 degrees before the position at which the table will stop), flow on-off valve, 17, is closed (cutting off the supply pressure from the die) and vacuum on-off valve, 19, is simultaneously opened.
9. The pressure setpoint ramp during vacuum application is calculated by the following relationship:

$$\text{Vacuum Ramp} = \frac{\text{(pressure at switch to vacuum-minimum pressure)}}{\text{(time from switch to vacuum to die lift + time from die to minimum pressure)}}$$

The pressure controller during this stage of the operation attempts to maintain the setpoint by manipulation of the vacuum control valve, 27.

10. When the rotation counter reaches 351.5 degrees (10 degrees before the position at which the table will stop), the speed of the table is ramped from 5 rpm to 7 rpm over 5 degrees of rotation by rotation controller 9.
11. When the pressure at the die reaches 15.6 psia, the vacuum on-off valve, 19, is closed. The die pressure continues to decrease for a short period and is controlled at 15.3 psia (1.08 kg/cm²).
12. When the rotation counter reaches 361.5 degrees the table rotation stops and the die is simultaneously lifted to break fluid contact with the disk.
13. The die is removed from the vicinity of the disk, the disk is covered with a transparent cover and the space above the disk is swept with nitrogen. The fluid is allowed to stand on the disk until 300 seconds after the time that the die lifted. During this levelling period, the table may be rotated at a slow speed (preferably 1 rpm or less) to negate the effects of gravity in the event the coating table is leveled imperfectly. The liquid is then exposed to untraviolet light to harden the material to a hard, clear coating.

After the coated layers of the examples had leveled for the prescribed period of time, they were photolytically cured. In this procedure, air over the coated disk was displaced with a nitrogen blanket and the disk was uniformly exposed for 20 seconds in a Fusion Products Areal Exposure Ultra Violet point source at a surface intensity of 18 watts/cm².

In Example 1, the resultant coating weighed 15.9 grams and had an average thickness of 6.8 mils (170 μm) with a peak-to-peak variation in thickness over the coated region of 0.9 mils (22.5 μm).

The results of the other five examples given in Table 3 illustrate that various fluid viscosities and process parameters may be used with the process of the invention to give uniformly flat coatings.

TABLE 2

| FIXED PROCESS PARAMETERS FOR EXAMPLES | |
|---|---|
| Pressure Profile | |
| 1. Position of disk at start of pressure ramp-up (degrees) | 0.0 |
| 2. Rotation of disk during pressure ramp-up (degrees) | 0.0 |
| 5. Rotation of disk during pressure ramp-down (degrees) | 5.0 |
| 6. Coating pressure at end of ramp-down (psia) | 14.8 |
| 7. Minimum pressure during vacuum application (psia) | 13.0 |
| Rotation Profile | |
| 12. Velocity at beginning of cycle (RPM) | 0.01 |
| 15. Velocity during coating (RPM) | 5.0 |
| 17. Rotation during acceleration at end of cycle (degrees) | 5.0 |
| Die Positioning Parameters | |
| 21. Acceleration of die during lift (in/sec/sec) | 1.0 |
| 22. Final velocity of die during lift (in/sec) | 1.0 |
| Miscellaneous Parameters | |
| 23. Die Clearance Height (mils) | 15 |

TABLE 3

| COATING PARAMETERS FOR EXAMPLES | | | | | | |
|---|---|---|---|---|---|---|
| | EXAMPLE | | | | | |
| | 1 | 2 | 3 | 4 | 5 | 6 |
| Fluid viscosity at 20° C. (cps) | 23 | 23 | 10 | 10 | 15 | 15 |
| Pressure Profile | | | | | | |
| 3. Maximum Coating Pressure (psia) | 46 | 46 | 23 | 23 | 40.3 | 35 |
| 4. Position of disk at start of pressure ramp-down (degrees) | 348.50 | 349.00 | 346.50 | 346.50 | 347.75 | 351.50 |
| 8. Position of disk at switch to vacuum (degrees) | 350.00 | 350.50 | 348.00 | 348.00 | 354.25 | 353.00 |
| 9. Time from die lift to minimum pressure (sec) | 0.5 | 0.5 | 0.5 | 0.5 | 0.15 | 0.15 |
| 10. Pressure at vacuum solenoid closure (psia) | 15.6 | 15.7 | 15.4 | 15.4 | 15.5 | 15.8 |
| 11. Hold pressure at end of vacuum application (psia) | 15.3 | 15.3 | 15.3 | 15.3 | 15.3 | 15.3 |
| Rotation Profile | | | | | | |
| 13. Position of disk at start of acceleration (degrees) | 0.012 | 0.010 | 0.008 | 0.008 | 0.049 | 0.049 |
| 14. Rotation of disk during acceleration (degrees) | 35 | 35 | 25 | 25 | 20 | 20 |
| 16. Position of disk at start of acceleration at end of cycle (degrees) | 351.50 | 352.00 | 353.00 | 353.00 | 349.25 | 353.00 |
| 18. Velocity after acceleration at end of cycle (RPM) | 7 | 7 | 7 | 7 | 6 | |
| 19. Position of disk at die lift (degrees) | 361.50 | 362.00 | 363.00 | 363.00 | 361.75 | 360.50 |
| 20. Position of disk at stop of rotation (degrees) | 361.50 | 362.00 | 363.00 | 363.00 | 361.75 | 360.50 |
| Miscellaneous Parameters | | | | | | |
| 24. Levelling time (sec) | 300 | 300 | 60 | 180 | 120 | 240 |
| Coating Results | | | | | | |
| Coating weight (g) | 15.9 | 16.1 | 15.3 | 15.6 | 15.2 | 14.1 |
| Coating thickness | | | | | | |
| Average (mils) | 6.8 | 6.8 | 6.5 | 6.6 | 8.8 | 7.9 |
| Peak-to-Peak Variability (mils) | 0.9 | 1.1 | 1.0 | 0.8 | 0.7 | 0.2 |

Each of the above-described coatings was levelled and cured by exposure to UV radiation. The composition of the coating formulations, curing times and curing properties are given in Table 4 below:

TABLE 4

COMPOSITION AND PROPERTIES OF PLANARIZED COATINGS

| Example | 1 | 2 | 3 | 4 | 5 | 6 |
|---|---|---|---|---|---|---|
| Chemical Composition | | | | | | |
| Cyclohexyl acrylate | — | — | 87.3 | 87.3 | 76.2 | 76.2 |
| Triethyleneglycol diacrylate | 86.9 | 86.5 | — | — | — | — |
| Celrad 7100[1] | 10.6 | 10.6 | — | — | — | — |
| Celrad 3600[1] | — | — | 8.7 | 8.7 | 20.0 | 20.0 |
| Irgacure 651[2] | 2.5 | 2.5 | 3.0 | 3.0 | 2.8 | 2.8 |
| Fluorad FC 430[3] | 1.0 | 1.0 | 1.0 | 1.0 | 1.0 | 1.0 |
| Coating Treatment | | | | | | |
| Leveling time, sec. | 300 | 300 | 60 | 180 | 120 | 240 |
| Radiation time, sec. | 20 | 20 | 20 | 20 | 20 | 20 |
| Coating Properties | | | | | | |
| Weight, g | 15.9 | 16.1 | 15.3 | 15.6 | 15.2 | 14.1 |
| Actual thickness, mils | 6.8 | 6.8 | 6.5 | 6.6 | 8.8 | 7.9 |
| Peak-to-peak variability, mils | 0.9 | 1.1 | 1.0 | 0.8 | 0.7 | 0.2 |

[1] Celrad is a registered trademark of Celanese Corporation, New York, New York for acrylated epoxy urethane and acrylate oligomers
[2] Irgacure is a registered trademark of C. B. Gigy Corporation, Ardsley, New York for α,α-dimethoxy-α-phenolacetalphenone
[3] Fluorad is a registered trademark of 3M Corporation, St. Paul, Minnesota, for fluorinated acrylate ester oligomers.

I claim:

1. A method for free surface casting a thin annular layer of film-forming liquid into an annular substrate in a single pass by means of a predetermined profile of laminar flow through a slot die while the substrate and slot die are undergoing rotation relative to each other about a vertical axis comprising the steps of:
   a. positioning the slot die closely over the surface of the substrate such that the long axis of the slot is situated radially with respect to the surface of the substrate;
   b. beginning relative rotation of the slot die and substrate about the vertical axis and flow of liquid through the die slot onto the substrate, thus forming a continuous thin film of liquid between the slot and the substrate;
   c. continuing rotation and liquid flow through a predetermined angular distance;
   d. stopping liquid flow near where the liquid thin film meets the liquid layer already on the substrate; and
   e. stopping rotation and breaking liquid-contact between the die and substrate.

2. A method for free surface casting a thin annular layer of film-forming liquid onto an annular substrate in a single pass by means of a predetermined profile of laminar flow through a slot die while the substrate and slot die are undergoing rotation relative to each other about a vertical axis comprising the sequential steps of:
   a. positioning the slot die closely over the surface of the stationary substrate such that the long axis of the slot is situated radially with respect to the surface of the substrate;
   b. simultaneously beginning relative rotation of the slot die and substrate about the vertical axis and flow of liquid through the die slot and both accelerating the rotation and increasing the flow to a preselected operating rate within a first predetermined angular distance;
   c. continuing rotation and liquid flow at the preselected opening rates through a second predetermined angular distance;
   d. simultaneously changing the rotation speed to a higher or lower constant rate and reducing the liquid flow to zero within a third predetermined angular distance;
   e. initiating reverse flow of film-forming liquid through the die;
   f. simultaneously stopping rotation and rapidly removing the slot die away from the surface of the substrate before it completely retraverses the first predetermined angular distance; and
   g. stopping reverse flow of film-forming liquid.

3. The method of claim 2 in which the slot die is comprised of a pair of confronting die members cooperating to define a pressure distribution zone communicating with an extrusion slot having spaced first and second ends terminating in a mouth, the length of the slot at the first end being greater than the length of the slot at the second end so that a predetermined flow profile is defined across the mouth of the slot from the first to the second end of the slot upon application of a given input pressure to flowable liquid filling the extrusion slot.

4. The method of claim 1 in which the slot die is rotated relative to the stationary substrate.

5. The method of claim 1 in which the substrate is rotated relative to the stationary slot die.

6. The method of claim 1 in which the edge of the slot die trailing over the liquid being placed on the substrate is a surface which is not wetted by the film-forming liquid, and the edge of the slot die leading the liquid being placed on the substrate is a surface which is wetted by the film-forming liquid.

7. The method of claim 1 in which the flow of liquid through the die is progressively higher toward the outer edge of the annular layer.

8. The method of claim 7 in which the variation in flow through the die is effected by the use of a land having progressively decreasing length toward the outer edge of the slot die relative to the annular layer.

9. The method of claim 2 in which the liquid flow rate is regulated by closed loop control of the liquid pressure at the slot die and the rotation speed is regulated by closed loop control of the substrate position.

10. The method of claim 9 in which the set points of both the pressure and rotation speed controllers are determined independently by the position of the substrate.

11. The method of claim 2 in which the fluid head in the slot die at the conclusion of the coating cycle is regulated by means of closed loop control of the liquid pressure.

12. The method of claim 1 in which the film-forming liquid is a hardenable material which is leveled by standing and then hardened by heating or photohardening.

13. The method of claim 1 further comprising the step of controlling the spread of liquid at the inner and outer edges of the annular layer by an increasing separation at said edges between a planar surface defined by the substrate and a planar surface on the die parallel to the substrate planar surface adjacent to the die slot.

14. The method of claim 1 in which the clearance distance between the slot die surface which faces the substrate and the substrate from the inner and outer edges of the annular layer is greater than the clearance height over the coating area of the substrate in order to reduce spreading of the coating liquid at the inner and outer edges of the annular layer.

* * * * *